(12) United States Patent
Purohit et al.

(10) Patent No.: US 11,308,761 B2
(45) Date of Patent: Apr. 19, 2022

(54) TICKETING SYSTEMS ON A DISTRIBUTED LEDGER

(71) Applicant: Aristocrat Technologies, Inc., Las Vegas, NV (US)

(72) Inventors: Nimish Purohit, Las Vegas, NV (US); Eric Taylor, Carson City, NV (US); Scott Dickerson, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 203 days.

(21) Appl. No.: 16/837,655

(22) Filed: Apr. 1, 2020

(65) Prior Publication Data

US 2020/0380825 A1    Dec. 3, 2020

Related U.S. Application Data

(60) Provisional application No. 62/855,429, filed on May 31, 2019.

(51) Int. Cl.
*G07F 17/00* (2006.01)
*G07F 19/00* (2006.01)
(Continued)

(52) U.S. Cl.
CPC .......... *G07F 17/3251* (2013.01); *G06F 16/27* (2019.01)

(58) Field of Classification Search
CPC ............. G07F 17/3225; G07F 17/3234; G07F 17/3241; G07F 17/3244; G07F 17/3251;
(Continued)

(56) References Cited

U.S. PATENT DOCUMENTS

| 7,003,139 B2 | 2/2006 | Endrikhovski |
| 7,168,089 B2 | 1/2007 | Nguyen |

(Continued)

FOREIGN PATENT DOCUMENTS

| GB | 201903234 | 4/2019 |
| WO | 2019089774 A1 | 5/2019 |
| WO | 2019089778 A1 | 5/2019 |

OTHER PUBLICATIONS

Brendan Koerner, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.

(Continued)

*Primary Examiner* — Milap Shah
(74) *Attorney, Agent, or Firm* — Armstrong Teasdale LLP

(57) ABSTRACT

A blockchain system for providing ticketing within a blockchain network of participating electronic devices includes an electronic gaming machine (EGM) configured to participate in the blockchain network. The EGM a memory storing a local blockchain and a system blockchain. The EGM also includes at least one processor configured to execute instructions which, when executed, cause the at least one processor to identify a first ticket creation blockchain transaction in the local blockchain from a ticket creation device of the first plurality of electronic gaming devices, the first ticket creation blockchain transaction including at least a ticket value and a ticket identifier (ID), create a system ticket creation blockchain transaction including at least the ticket value and the ticket ID, and broadcast the system ticket creation blockchain transaction to the system blockchain.

20 Claims, 7 Drawing Sheets

(51) Int. Cl.
  *G07F 17/32* (2006.01)
  *G06F 16/27* (2019.01)
(58) Field of Classification Search
  CPC ........ A63F 13/352; A63F 13/70; A63F 13/73; A63F 13/792; A63F 2300/575; H04L 9/3239; H04L 2209/38
  See application file for complete search history.

(56) References Cited

U.S. PATENT DOCUMENTS

| | | | |
|---|---|---|---|
| 7,316,615 | B2 | 1/2008 | Soltys |
| 7,951,003 | B2 | 5/2011 | Russell |
| 8,157,647 | B2 | 4/2012 | House |
| 8,303,417 | B2 | 11/2012 | Burke |
| 8,449,378 | B2 | 5/2013 | Michaelson |
| 8,608,568 | B2 | 12/2013 | Carpenter |
| 8,777,758 | B2 | 7/2014 | Anderson |
| 8,801,517 | B2 | 8/2014 | Walker |
| 8,917,971 | B2 | 12/2014 | Woods |
| 9,033,791 | B2 | 5/2015 | Hamlin |
| 9,084,937 | B2 | 7/2015 | Gadher |
| 9,117,339 | B2 | 8/2015 | Burke |
| 9,269,216 | B2 | 2/2016 | Keilwert |
| 9,367,991 | B2 | 6/2016 | Acres |
| 9,865,139 | B2 | 1/2018 | Walker |
| 10,037,648 | B2 | 7/2018 | Acres |
| 10,223,679 | B2 | 3/2019 | Lee |
| 10,275,583 | B2 | 4/2019 | Leuthardt |
| 10,297,106 | B1 | 5/2019 | Simons |
| 10,322,727 | B1 | 6/2019 | Chan |
| 10,425,426 | B1 | 9/2019 | Simons |
| 10,530,569 | B2 | 1/2020 | Bisti et al. |
| 10,549,202 | B2 | 2/2020 | McCoy et al. |
| 10,741,017 | B2 | 8/2020 | Silva |
| 2005/0043086 | A1 | 2/2005 | Schneider |
| 2006/0166732 | A1* | 7/2006 | Lechner .............. G07F 17/3251 463/25 |
| 2006/0205488 | A1 | 9/2006 | Gagner |
| 2010/0248812 | A1 | 9/2010 | Pacey |
| 2010/0291994 | A1* | 11/2010 | Denham ................ G07F 17/32 463/25 |
| 2012/0028703 | A1 | 2/2012 | Anderson |
| 2012/0035751 | A1 | 2/2012 | Dimitriadis |
| 2014/0323194 | A1 | 10/2014 | Keilwert |
| 2015/0279155 | A1 | 10/2015 | Chun |
| 2016/0012465 | A1* | 1/2016 | Sharp .................. G06Q 20/386 705/14.17 |
| 2016/0292558 | A1* | 10/2016 | Vienneau ......... G06K 19/07707 |
| 2016/0335840 | A1 | 11/2016 | Acres |
| 2017/0061731 | A1 | 3/2017 | Colvin |
| 2017/0161991 | A1 | 6/2017 | Ayati |
| 2017/0287593 | A1 | 10/2017 | Ovalle |
| 2017/0293669 | A1* | 10/2017 | Madhavan .......... G06F 16/2365 |
| 2017/0300876 | A1* | 10/2017 | Musiala, Jr. ........... G06Q 20/36 |
| 2017/0316644 | A1* | 11/2017 | Arnone ............... G07F 17/3223 |
| 2018/0019867 | A1* | 1/2018 | Davis ................... H04L 9/0637 |
| 2018/0096752 | A1 | 4/2018 | Ovalle |
| 2018/0114403 | A1 | 4/2018 | Jayachandran |
| 2019/0028264 | A1 | 1/2019 | Bisti et al. |
| 2019/0028265 | A1 | 1/2019 | Bisti et al. |
| 2019/0096191 | A1 | 3/2019 | Stuehling |
| 2019/0122300 | A1 | 4/2019 | O'Brien |
| 2019/0122492 | A1 | 4/2019 | Nguyen |
| 2019/0122495 | A1 | 4/2019 | Yi |
| 2019/0130698 | A1 | 5/2019 | Simons |
| 2019/0130701 | A1 | 5/2019 | Simons |
| 2019/0143207 | A1 | 5/2019 | Kumar |
| 2019/0163672 | A1* | 5/2019 | Shmueli ............. G06F 16/1824 |
| 2019/0180558 | A1* | 6/2019 | Merati ............... G06Q 20/3678 |
| 2019/0205894 | A1* | 7/2019 | Gonzales, Jr. ......... G06Q 20/42 |
| 2019/0221076 | A1 | 7/2019 | Simons |
| 2019/0280875 | A1 | 9/2019 | Ragnoni et al. |
| 2019/0295371 | A1 | 9/2019 | Simons |
| 2019/0314726 | A1 | 10/2019 | Masini |
| 2019/0325700 | A1 | 10/2019 | Jayachandran |
| 2019/0333285 | A1 | 10/2019 | Delia et al. |
| 2019/0373015 | A1 | 12/2019 | Kozloski et al. |
| 2020/0021600 | A1 | 1/2020 | Simons |
| 2020/0027315 | A1 | 1/2020 | Cotton |
| 2020/0051368 | A1 | 2/2020 | Pustizzi |
| 2020/0090463 | A1* | 3/2020 | Mohrhardt .......... G07F 17/3244 |
| 2020/0097862 | A1* | 3/2020 | Arora .................... G06K 7/1413 |
| 2020/0105096 | A1* | 4/2020 | Ovalle ................. H04L 9/3239 |
| 2020/0110855 | A1* | 4/2020 | Cunningham ........ H04L 9/0643 |
| 2020/0152005 | A1* | 5/2020 | Higgins ............... G06Q 20/065 |
| 2020/0211325 | A1 | 7/2020 | Kaizerman |
| 2021/0233351 | A1* | 7/2021 | Meltzer ............ G06Q 20/38215 |

OTHER PUBLICATIONS

Brendan Koemer, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.

Office Action dated Mar. 8, 2021 for U.S. Appl. No. 16/415,654 (pp. 1-12).

* cited by examiner

TICKETING SYSTEMS ON A DISTRIBUTED LEDGER

CROSS-REFERENCE TO RELATED APPLICATION

This patent application claims the benefit priority of U.S. Provisional Patent Application Ser. No. 62/855,429, filed May 31, 2019, entitled TICKETING SYSTEMS ON A DISTRIBUTED LEDGER, the entire contents and disclosure of which is hereby incorporated by reference in its entirety.

TECHNICAL FIELD

The field of disclosure relates generally to electronic gaming, and more particularly to electronic gaming systems and methods for providing coinless ticketing using blockchain technology.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Many modern EGMs provide coinless ticketing ("ticket-in/ticket-out," or "TITO"), a print-based technology that allows players to exchange value with EGMs via printed ticket rather than via coin currency. Such TITO-based EGMs typically include a bill validator, a ticket reader, and a ticket printer. During game play, a player may insert cash into the bill validator to establish a credit at the EGM. The player uses their credit to place wagers during game play (e.g., for slot gaming, virtual poker, keno, and such). Upon conclusion of their gaming session, when the player "cashes out," the EGM uses the ticket printer to print a ticket for the player. The ticket is a voucher embodying the player's unused credit from their play session. The player may then redeem that voucher at either a cashier (e.g., for cash) or at another TITO-based EGM (e.g., for credit). When the player chooses to play at another EGM, the player inserts the ticket into the ticket reader. The EGM collects the ticket and establishes the appropriate credit on the EGM for game play.

Coinless ticketing systems have provided improvements in the electronic gaming industry. However, such conventional ticketing systems rely upon a client/server architecture that presents technical challenges including, for example, system reliability (e.g., outages, uptime, system maintenance, single point of failure) and security (e.g., hacking, auditing, regulatory compliance). It would be beneficial to have a ticketing system that mitigated many of the technical problems of conventional ticketing systems.

BRIEF SUMMARY

In one aspect, a blockchain system for providing ticketing within a blockchain network of participating electronic devices is provided. The blockchain system includes an electronic gaming machine configured to participate in the blockchain network. The electronic gaming machine includes a memory storing a local blockchain and a system blockchain. The local blockchain supports a first plurality of electronic gaming devices of the blockchain network. The system blockchain supports a second plurality of electronic gaming devices of the blockchain network. The electronic gaming machine also includes at least one processor configured to execute instructions. When executed, the instructions cause the at least one processor to identify a first ticket creation blockchain transaction in the local blockchain from a ticket creation device of the first plurality of electronic gaming devices. The first ticket creation blockchain transaction includes at least a ticket value and a ticket identifier (ID). The instructions also cause the at least one processor to create a system ticket creation blockchain transaction including at least the ticket value and the ticket ID. The instructions further cause the at least one processor to broadcast the system ticket creation blockchain transaction to the system blockchain.

In another aspect, a computer-implemented method for providing ticketing within a blockchain network of participating electronic devices sharing a blockchain is provided. The method is performed by an electronic gaming machine participating as a node in the blockchain network. The blockchain is a distributed ledger tracking redeemable tickets. The method includes receiving an initiation of a cash-out event by a player of the electronic gaming machine. The method also includes identifying a credit balance at the electronic gaming machine. The method further includes generating a ticket identifier for a redeemable ticket. The method also includes creating a first blockchain transaction including at least (1) a ticket value equal to the credit balance, (2) the ticket identifier, and (3) a transaction type identifying the first blockchain transaction as a ticket creation transaction within the blockchain. The method further includes transmitting the first blockchain transaction to one or more nodes of the blockchain network for addition to the blockchain.

In yet another aspect, a computer-implemented method for providing ticketing within a peer-to-peer blockchain network of participating electronic devices sharing a blockchain is provided. The method is performed by an electronic gaming machine participating as a node in the peer-to-peer blockchain network. The blockchain is a distributed ledger tracking redeemable tickets. The method includes receiving, at a ticket reader of the electronic gaming machine, a physical ticket for redemption, the physical ticket including a ticket identifier. The method also includes identifying the ticket identifier from the physical ticket. The method further includes searching the blockchain for (1) a ticket creation transaction associated with the ticket identifier and for (2) an existing ticket redemption transaction associated with the ticket identifier, the ticket creation transaction including a ticket value. When the ticket creation transaction associated with the ticket identifier is located by the search and when the existing ticket redemption transaction is not located by the search, the method includes establishing a credit at the electronic gaming machine for an amount equal to the ticket value identified in the ticket creation transaction within the blockchain, creating a ticket redemption transaction including the ticket identifier, and transmitting the ticket redemption transaction to one or more nodes of the peer-to-peer blockchain network for addition to the blockchain.

In still another aspect, a system of electronic devices participating in a peer-to-peer blockchain network sharing a blockchain is provided. The blockchain is a distributed ledger tracking redeemable tickets. The system includes a first participating device. The first participating device is configured to receive a ticket generation request, identify a ticket value and source of funds to apply to the ticket generation request, generate a ticket identifier for a redeemable ticket, create a first blockchain transaction including at least (1) the ticket value, (2) the ticket identifier, and (3) a transaction type identifying the first blockchain transaction as a ticket creation transaction within the blockchain, transmit the first blockchain transaction to one or more nodes of the peer-to-peer blockchain network for addition to the blockchain, and print a physical ticket at a ticket printer of the first participating device, the physical ticket including the ticket identifier. The system also includes a second participating device. The second participating device is configured to receive, at a ticket reader of the second participating device, the physical ticket for redemption, read the ticket identifier from the physical ticket, search the blockchain for (1) a ticket creation transaction associated with the ticket identifier and for (2) an existing ticket redemption transaction associated with the ticket identifier, the ticket creation transaction including a ticket value, determine that the physical ticket is valid and active based on the search, redeem the ticket value at the second participating device, create a ticket redemption transaction including the ticket identifier, and transmit the ticket redemption transaction to one or more nodes of the peer-to-peer blockchain network for addition to the blockchain.

BRIEF DESCRIPTION OF THE DRAWINGS

An example embodiment of the subject matter disclosed will now be described with reference to the accompanying drawings.

DETAILED DESCRIPTION

Figure 1:
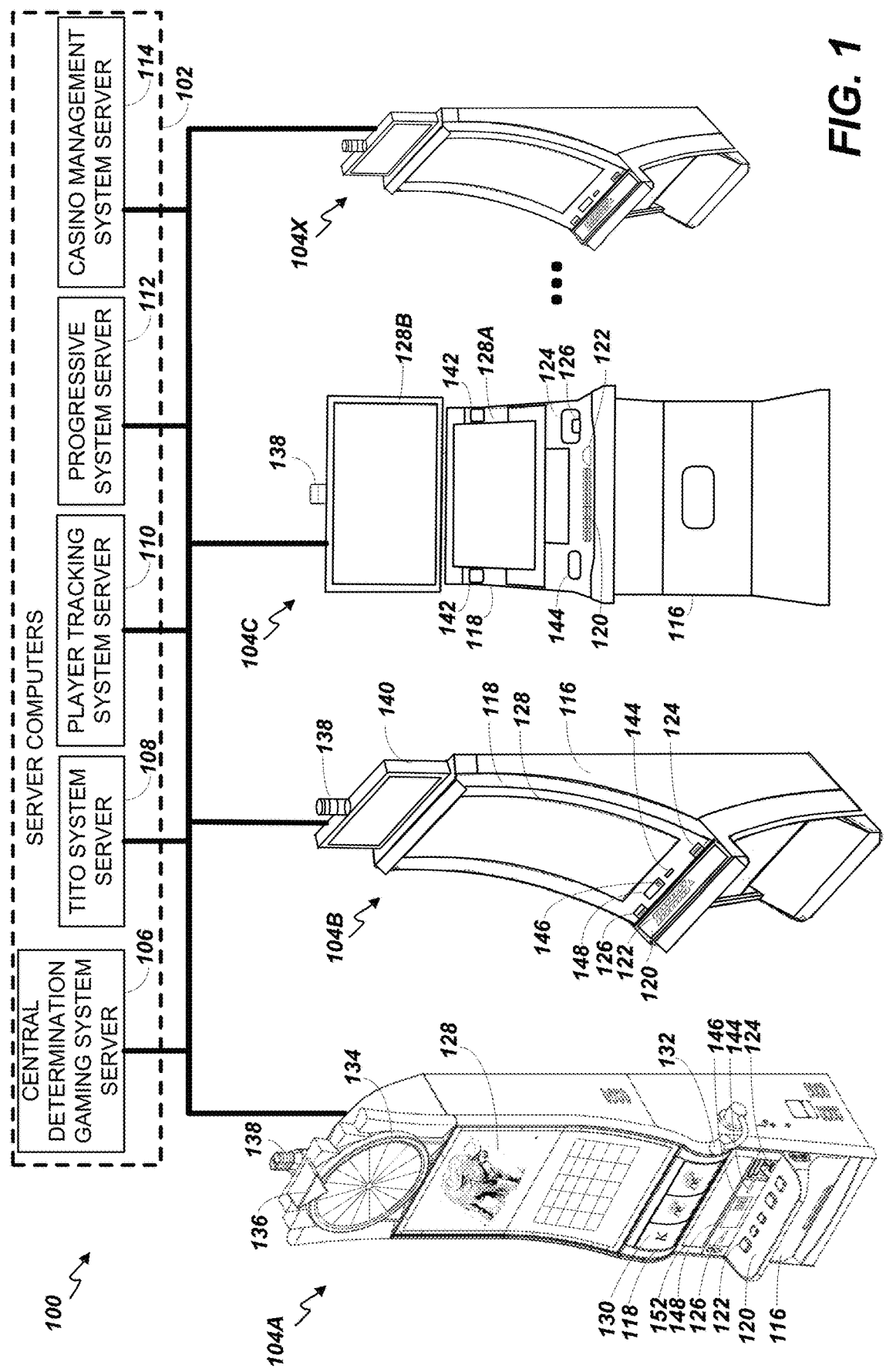
FIG. 1 is a diagram of exemplary EGMs networked with various gaming-related servers.

A ticketing blockchain system is described herein that may be used to decentralize aspects of coinless ticketing transaction management, allowing EGMs to provide coinless TITO using blockchain technology. Decentralized ledger technology (e.g., blockchain) may be used to provide a distributed ledger amongst participating nodes in a blockchain network (e.g., a peer-to-peer network) that may provide aspects of decentralization, tracking, immutability, security, and transparency for transaction data added to the ledger. Conventional TITO systems using a centralized architecture typically rely upon a server (e.g., a TITO server) to centrally manage TITO ticket operations (e.g., ticket creation, management, and redemption). Such centralization can be subject to certain exposures, such as server downtime or single point of failure, data integrity risks (e.g., tampering, corruption, hacks), or the like. Aspects of blockchain technology and associated distributed architecture can provide a technological solution to many of these problems of centralized architectures.

In an example embodiment, aspects of blockchain technology are employed by the ticketing blockchain system to support ticketing for a group of participating EGMs in a permissioned blockchain. The ticketing blockchain system establishes one or more blockchains that are used to conduct and manage ticketing transactions. Various trusted electronic devices may participate in the ticketing blockchain system, such as EGMs (e.g., for creating tickets and redeeming tickets for credit at the gaming device), gaming tables or associated support devices (e.g., for issuing or redeeming tickets for chips at the gaming tables), teller nodes (e.g., kiosks and cashier devices for redeeming tickets for cash), and administrative nodes (e.g., for audit, accounting, and various support functionality). When a player initiates a cash out operation at an EGM, the EGM prints a ticket with the credit balance of the player and also creates a "ticket-out" transaction within the ticketing blockchain system that memorializes the ticket-out transaction for that ticket into the blockchain (e.g., credit value, ticket identifier, ticket account, source device identifier, and perhaps other accounting and auditing data). When the player redeems the ticket at a transacting node (e.g., at an EGM, a teller node, or the like), the transacting node reads the ticket information from the ticket and searches the blockchain to determine whether the ticket is authentic and valid. If the search of the blockchain identifies the previously-entered "ticket-out" transaction within the blockchain and verifies that the ticket has not yet been redeemed (e.g., no existing "ticket-in" transaction in the blockchain or in other pending transactions), then the ticket is verified as valid and active. Once verified, the transacting node creates a "ticket-in" transaction within the ticketing blockchain system that memorializes the ticket-in transaction, thereby identifying the ticket as redeemed. The transacting node provides the value of the ticket to the player (e.g., as a credit for the player at the transacting device, confirming eligibility for a cash payment to the player at a kiosk, table, or cashier, or the like). As such, the ticket-in transaction being added to the blockchain serves as notice to all other participating nodes that the once-active ticket is no longer active, as having been previous redeemed in full.

In some embodiments, the ticketing blockchain system provides a tiered architecture of blockchains. The tiered architecture groups EGMs into EGM clusters. Each EGM cluster includes several EGMs that may be physically in proximity to each other (e.g., two to twelve EGMs). Each EGM cluster shares a cluster blockchain isolated to that cluster, with each EGM in the cluster participating in the cluster blockchain as a ticketing blockchain node. There may be several EGM clusters at a given property or across several properties.

In addition, one node of each EGM cluster is designated as a "leader node" for that cluster. Each of the leader nodes of the various EGM clusters participates in a "system blockchain" in which dozens or hundreds of EGMs may participate. The leader nodes for each cluster act as transaction replicators between the cluster blockchains and the system blockchain. As nodes add ticket deposit transactions into the cluster blockchain (e.g., as tickets are created) or add ticket withdrawal transactions into the cluster blockchain (e.g., as tickets are redeemed), the leader node for that cluster inspects the cluster blockchain for new transactions. Any transactions newly added to the cluster blockchain are then replicated by the leader node out into the system blockchain, thereby causing the cluster deposits and withdrawals to be reflected in the overall system-level blockchain. Similarly, the leader node also inspects the system blockchain for any transactions newly added by other system-level nodes and replicates those deposits (or withdrawals) into the cluster blockchain.

In example embodiments, the ticketing blockchain system is comprised of trusted nodes in a permissioned blockchain network. The ticketing blockchain provides no tokenization or rewards for mining, as there is no need to incentivize participation for the work contributed by the nodes. Further, the processing and energy consumption demands to nodes on the blockchain can be reduced by replacing the proof of work ("PoW") processing with other consensus mechanisms that dictate which node will add the next block to the blockchain, such as proof of stake ("PoS"), tangle, swirlds, delegated proof of stake, proof of selection, one or more delegated block generators, or the like.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XLTM model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
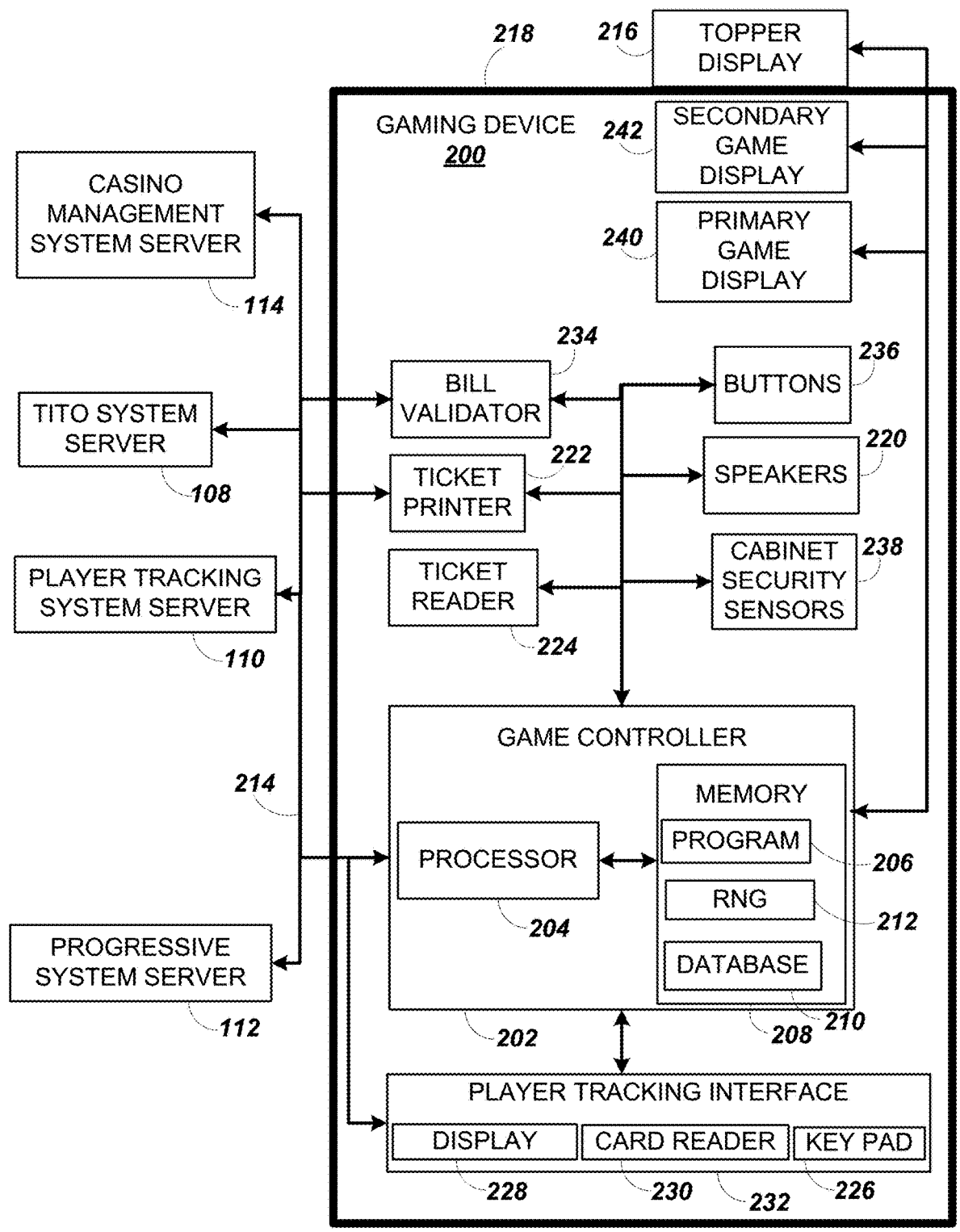
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In the example embodiment, the TITO system server 108 participates as an administrative node in a ticketing blockchain (not depicted in FIG. 1). The TITO system server 108 includes blockchain software that allows for the server 108 to perform blockchain functionality such as, for example, receiving and inspecting the blockchain, broadcasting transactions into the blockchain, and creating blocks for the blockchain (e.g., mining). Various ticketing blockchain functionality is described in greater detail below.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide a technological improvement in the field of EGM technology in that the EGM blockchain technology described herein utilizes aspects of blockchain technology to provide a decentralized ticketing amongst multiple EGMs in a secure fashion and that eliminates the need for some traditional hardware elements.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

In the example embodiment, the gaming device 200 participates in one or more blockchains that support TITO ticketing. Ticketing operations may be memorialized as blockchain transactions, thereby decentralizing ticketing amongst participating nodes (e.g., EGMs, table games, teller nodes, admin nodes). When the gaming device 200 inserts cash in the bill validator 234 or a ticket into the ticket reader 224, the gaming device 200 may create and broadcast a coin-in transaction or a ticket-in transaction, respectively, into the blockchain while establishing a credit on the gaming device 200 (e.g., to an EGM account). When the player cashes out, the gaming device 200 not only prints a ticket representing the player's credit balance, but also creates and broadcasts a ticket-out transaction into the blockchain to create the ticket.

Figure 3:
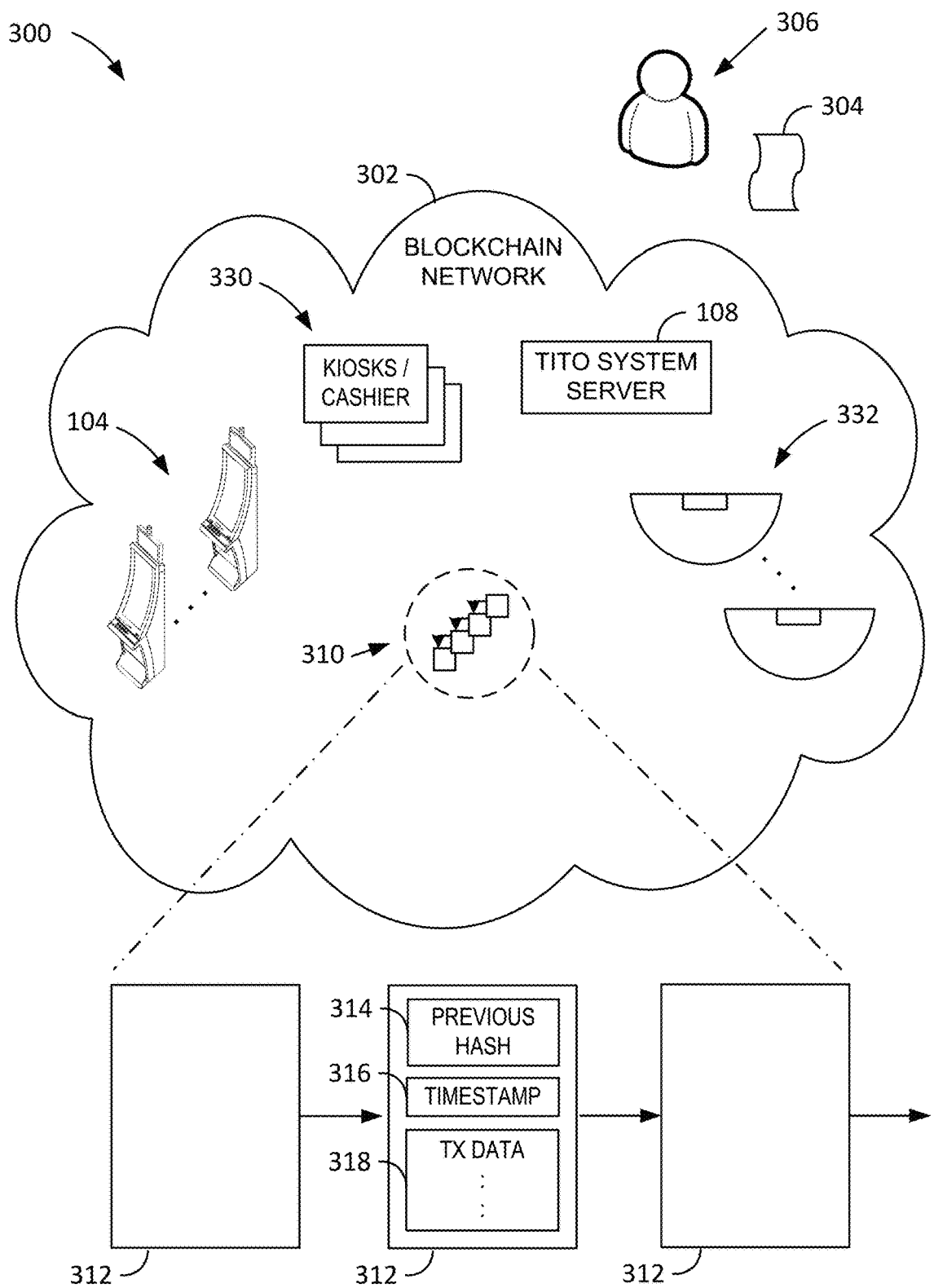
FIG. 3 is a networked environment of a ticketing blockchain system in which various devices provide ticketing using a distributed ledger (e.g., a blockchain).

FIG. 3 is a networked environment of a ticketing blockchain system 300 in which various devices provide ticketing using a distributed ledger (e.g., blockchain) 310. In the example embodiment, the system 300 includes a blockchain network 302 (e.g., a peer-to-peer ("P2P") network) in which various devices participate in a permissioned blockchain 310 that is used for issuing and redeeming TITO tickets (e.g., within a gaming environment). Participating devices may include gaming devices 104, kiosks (or cashier devices) 330, TITO system server 108, and gaming tables 332 (e.g., table games which support TITO ticketing at tables), each of which may be involved in the issuing, redeeming, or accounting of TITO tickets 304. For example, gaming devices 104, kiosks 330, or table games 332 may be configured to issue TITO tickets (or just "ticket") 304 to players 306, typically by printing a slip of paper that the player 306 can carry around and redeem at various gaming venues, kiosks/cashiers 330, or the like. Redeeming devices can accept the tickets 304, typically using an optical scanner to read data from the ticket 304, such as a unique ticket identifier ("ticket ID"), a value, or other authentication information, each of which may be embodied in an optical label that can visually embody data, such as a QR code or a barcode. The ticket 304 represents a cashless method of embodying cash value that can be of convenience to players 306 during their gaming experiences, allowing the player 306 to minimize the use of cash during game play. While the participating devices are coupled in networked communication through underlying networking technology not shown or described here for purposes of brevity, it should be understood that blockchain network 302 shown in FIG. 3 represents devices participating in a peer-to-peer relationship with other devices permissioned to participate in the blockchain 310, but may also include aspects of centralized communication (e.g., between gaming devices 104 and TITO system server 108). Blockchain network 302 may include any underlying networking technologies, hardware, or protocols sufficient to enable the systems and methods described herein.

In the example embodiment, the participating devices (also referred to herein as "nodes") of the network 302 perform ticketing transactions (e.g., ticket creations, ticket redemptions) and track ticketing data through the blockchain 310. One example ticketing transaction performed in the blockchain 310 is a "ticket-out" transaction. When a new ticket is to be created at a participating node (e.g., during a "cash-out" operation at a gaming device 104), that device is responsible for accepting value from the player 306, printing the ticket 304, and for transmitting a ticket-out transaction into the blockchain 310 (i.e., into the blockchain network 302) for addition as a "blockchain transaction" to the blockchain 310. The ticket-out transaction memorializes the new ticket and various information within the blockchain 310, which may subsequently be used to during ticket redemption.

Another example ticket transaction performed in the blockchain 310 is a "ticket-in" transaction. When a ticket is presented for redemption at a participating node (e.g., during a "ticket-in" operation at a gaming device 104, kiosk/cashier 330, or table 332), that redeeming device is responsible for scanning information from the ticket, validating through the blockchain 310 that the ticket is valid and unredeemed, transmitting a "ticket-in" transaction into the blockchain 310, and providing or otherwise authorizing the transfer of the ticket value to the player 306. The ticket-in transaction memorializes the redemption of that ticket within the blockchain 310, thereby changing the status of the ticket to redeemed and thus prohibiting other devices from redeeming the ticket a second time.

The blockchain 310 includes a linked list of blocks 312. Each block 312, in the example embodiment, includes a previous hash 314, a timestamp 316, and one or more blockchain transaction records (also referred to herein as "block transaction data," "TX DATA", or simply transactions or records) 318. As is known in the art, blockchain technology uses aspects of encryption and digital signatures to create a distributed, immutable ledger (e.g., the blockchain 310). The network 302 uses a cryptographic hash function (e.g., SHA-256, Merkle Trees, Keccak/SHA-3, or the like) to generate and memorialize a hash of the previous block as the previous hash 314. The block transaction data 318 includes a record for each transaction added to a particular block 312. The blocks 312 may contain other components not expressly called out here for purposes of brevity. As is known in the art, all nodes in the network 302 execute a blockchain client that allows participation in the network 302 and maintains a copy of the blockchain 310 and may also include pending transactions received from other peer nodes prior to memorialization into a new block 312. Further, each node in the network 302 maintains a unique identity in the network 302 and may generate and use a unique public/private key pair, maintaining the private key locally and publishing the public key to other nodes in the network (e.g., for validating transactions added to the blockchain 310). It should be understood that the present disclosure uses many aspects of blockchain technology (e.g., Blockchain 1.0, Blockchain 2.0 technologies) and, particularly, for permissioned blockchains and smart contracts, that are not expressly described herein for purposes of brevity.

In some embodiments, the ticketing blockchain system 300 is comprised of trusted nodes in a permissioned blockchain network (e.g., network 302) that provides no tokenization or rewards for mining, as there is no need to incentivize participation for the work contributed by the nodes. Further, the processing and energy consumption demands to nodes on the blockchain can be reduced by replacing the proof of work ("PoW") processing with other consensus mechanisms that dictate which node will add the next block to the blockchain, such as proof of stake ("PoS"), tangle, swirlds, delegated proof of stake, proof of selection, one or more delegated block generators, or the like. As such, any of the participating devices may be eligible to consolidate transactions and add blocks 312 to the blockchain 310 and can avoid the processing overhead of typical proof of work consensus protocols.

In the example embodiment, certain types of blockchain transactions 318 may include various data fields that allow the blockchain 310 to memorialize various information that facilitates both the creation, tracking, and redemption of tickets 304, as well as supporting accounting, auditing, and regulatory compliance of the ticketing blockchain system 300. For example, ticket-in and ticket-out type transactions include a ticket value indicating a redemption value for the ticket (e.g., currency value, credit value, or the like). At the time of a ticket-out event, the issuing device determines a ticket value of the ticket (e.g., based on a current credit total of the player 306 at a gaming device 104, based on an amount paid by the player 306 at a kiosk/cashier device 330).

Each such transaction also includes a unique ticket ID for the ticket 304. The ticket ID is a unique ID for each ticket generated and used by the ticketing blockchain system 300. In some embodiments, the issuing device generates the unique ticket ID when creating the ticket (e.g., by concatenating a unique machine identifier of the issuing device together with a unique ticket string or index locally generated and tracked by the device, with a timestamp, or the like). In other embodiments, a central server, such as the TITO system server 108, may provide unique ticket IDs to the participating nodes within the network 302 during ticket creation. In some embodiments, the TITO system server 108 may provide a validation code for the ticket 304 that is recorded in the blockchain 310, and that validation code may be used as the ticket ID or as a part of the ticket ID. The ticket ID is used by the ticketing blockchain system 300, in some cases, as an account number for the ticket within the blockchain 310.

Once the issuing device identifies the ticket data, the issuing device prints the ticket 304 at a local ticket printer (e.g., ticket printer 222), including ticket ID and ticket value, optical image, and the like. The issuing device also broadcasts a ticket-out transaction to the blockchain 310 (e.g., as a blockchain transaction 318 into the network 302). The ticket-out transaction includes a transaction type (e.g., a code identifying this blockchain transaction 318 as a ticket-out transaction, ticket creation transaction, or the like), the unique ticket ID, and the ticket value. In some embodiments, the ticket-out transaction may include a device ID of the issuing device, a ticket issuance timestamp, or a player ID (e.g., a unique ID identifying the player 306 to which the ticket is issued). Having been broadcast into the network 302, this ticket-out transaction will eventually be bundled together with other transactions and added to the blockchain 310 by a mining node or other duly elected node, subsequently updating the blockchain 310 with the new block throughout the network 302. The ticket-out transaction effectively acts to publish the validity of a new ticket into the network 302.

When the player 306 presents the ticket 304 for redemption (e.g., at a gaming device 104, kiosk/cashier device 330, table game 332, or the like), the redeeming device scans the ticket 304 to read the embodied information on the ticket 304 (e.g., the ticket ID). The redeeming device uses the ticket ID to determine whether the ticket is valid (e.g., properly created) and active (e.g., not yet redeemed or otherwise cancelled) by scanning the blockchain 310 and other pending transactions for transactions 318 identifying that particular ticket ID. Other pending transactions refers to transactions 318 that have been submitted for addition to the blockchain 310 but, due to timing considerations, have not yet been memorialized in a new block 312 of the blockchain 310. If the ticket 304 is verified as both valid and still active, then the redeeming device determines a redemption value for the ticket 304 based on the ticket-out transaction in the blockchain 310 and provides that redemption value to the player 306 (e.g., via credit on a gaming device 104, via chips at a table game 332, via alerting a cashier to present cash to the player 306 at a cage, via cash payout or balance transfer to a player account at a kiosk, or the like). Further, the redeeming device broadcasts a ticket-in type transaction to the blockchain 310 (e.g., as a blockchain transaction 318 into the network 302). The ticket-in transaction includes a transaction type (e.g., a code identifying this blockchain transaction 318 as a ticket-in transaction, ticket redemption transaction, or the like) and the unique ticket ID. In some embodiments, the ticket-in transaction may include a device ID of the redeeming device, a ticket redemption timestamp, a player ID of the redeeming player (e.g., a unique ID identifying the player 306 to which the ticket is redeemed), or a redemption value. Having been broadcast into the network 302, this ticket-in transaction will eventually be bundled together with other transactions and added to the blockchain 310 by a mining node or other duly elected node, subsequently updating the blockchain 310 with the new block throughout the network 302. The ticket-in transaction effectively acts to publish the redemption of an existing ticket, thereby causing the ticket to become inactive after one redemption.

In some embodiments, the ticketing blockchain system 300 may facilitate other blockchain uses for the blockchain 310 and participating devices. In other words, the blockchain 310 may support other types of blockchain transactions unrelated to ticketing. For example, the ticketing blockchain system 400 may track coin-in events within the blockchain(s) 412, 422. During a coin-in event, a gaming device 104 may generate a coin-in type blockchain transaction 318 to include a dollar value accepted from a bill validator 234, a unique device ID of the gaming device 104, and a timestamp. In some embodiments, the EGM 410B may also generate a unique coin-in ID for each coin-in event similar to the unique ticket ID. In such embodiments, the coin-in transaction 318 may be treated as a source of value for a later ticket-out transaction at that gaming device 104.

In normal operation, each transaction 318 propagates throughout the network 302 and is thus available to any of the participating devices, eventually appearing in their local copy of the blockchain 310. However, in some situations, one or more participating devices may become separated, segmented, or otherwise disconnected from some or all of the ticketing blockchain system 300. For example, presume a gaming device 104 becomes isolated from the network 302 at a point in time. In such a situation, if that gaming device 104 generates and prints a new ticket 304 with a value of $50.00, the corresponding broadcast of the ticket-out transaction 318 to the broader network 302 will fail (e.g., not be received by any of the other participating devices), and thus will not get promptly added to the blockchain 310. As such, if the player 306 takes the ticket 304 to another participating device, that redemption device will not be able to locate and verify the ticket-out transaction 318 associated with that ticket 304 (referred to herein as an "unidentified ticket" scenario).

In some embodiments, when an unidentified ticket is submitted for redemption to another participating device, that device may refuse to honor the ticket 304, may hold or return the ticket 304 to the player 306, or may alert staff to investigate the issue.

In the example embodiment, validation codes are included with each new ticket transaction, and may be used during unidentified ticket scenarios. Validation codes serve as a secret signature (e.g., generated via RNG) that may be associated with a particular ticket and used for authentication of the ticket. In some embodiments, validation codes may be generated by the TITO ticket server 108. In other embodiments, validation codes may be generated by the issuing devices. In some embodiments, a pool of pre-generated validation codes for tickets may be created and assigned to issuing devices. The pre-generated validation codes for all nodes in the blockchain 310 are stored in the blockchain 310 and, as such, all nodes have knowledge of all of the pre-generated validation codes. During a segmentation scenario (e.g., if a node temporarily loses network communication with other nodes in the network 302, or a cluster blockchain temporarily loses communication with the system blockchain), the segmented device may utilize one of the pre-generated validation codes during new ticket generation. Because of the segmentation, the locally-generated transaction may not be able to be fully transmitted to the other parts of the network 302. However, since all nodes have knowledge of the pre-generated validation code, the other nodes can still validate at least the authenticity of the code, though not able to verify the credit value printed on the ticket 304 versus the credit value within the associated blockchain transaction (e.g., the ticket-out transaction 318 for that ticket 304). In some embodiments, the ticketing blockchain system 400 may be configured to redeem such segmented tickets (e.g., tickets not appearing in their version of the blockchain 310 but having an authentic validation code) if certain segmented ticket validation criteria are met. For example, the operator may be willing to accept risk for tickets under a certain pre-determined threshold (e.g., less than $100 or less than $500), or for a certain period of time (e.g., less than 10 minutes old, less than 30 minutes old).

Figure 4:
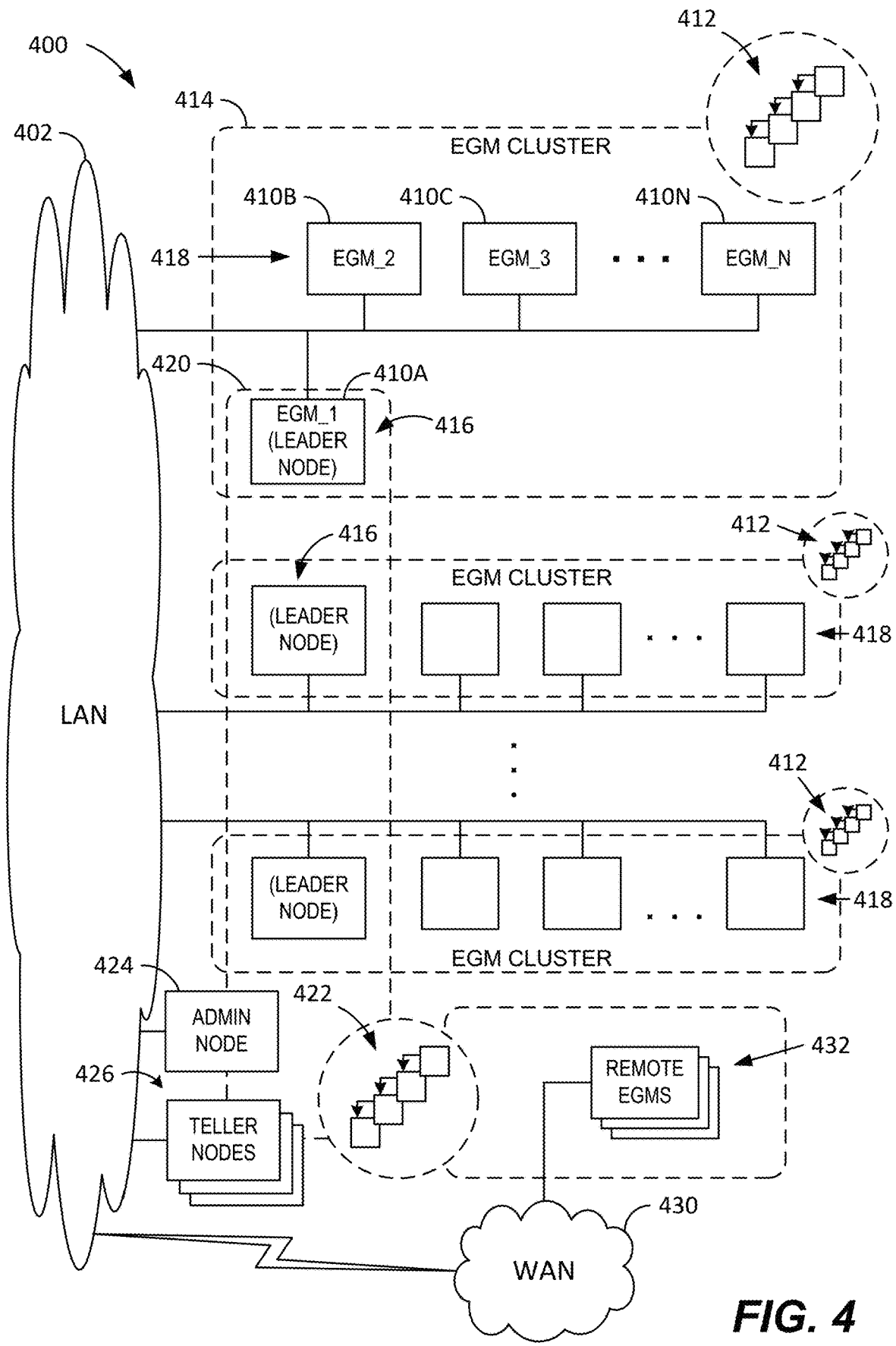
FIG. 4 is a networked environment of a ticketing blockchain system in which EGMs provide ticketing using one or more blockchains.

FIG. 4 is a networked environment of a ticketing blockchain system 400 in which EGMs provide ticketing using one or more blockchains 412, 422. In some embodiments, aspects of the ticketing blockchain system 400 may be similar to the ticketing blockchain system 300 of FIG. 3, and the blockchains 412, 422 may be similar to the blockchain 310 shown in FIG. 3. In the example embodiment, the ticketing blockchain system 400 includes a set of EGMs 410A-N (collectively, EGMs 410) logically grouped together as an EGM cluster 414. EGMs 410 may be grouped into EGM clusters 414 based on, for example, physical proximity to each other (e.g., a bank of EGMs, a room of EGMs at a property, all of the EGMs at a particular property), network connectivity (e.g., by subnet or IP range, by shared connectivity to a particular network device), or by a logical grouping (e.g., a set of EGMs participating in a particular progressive, a new set of EGMs recently installed at a property). Each of the EGMs 410 may be similar to the gaming devices 104 shown in FIG. 1 or the gaming device 200 shown in FIG. 2. The EGMs 410 are network-connected to a local area network (LAN) 402 (e.g., an Ethernet/IP network). While not individually numbered, several EGM clusters similar to EGM cluster 414 are illustrated in FIG. 4. And while not individually numbered, each of those EGM clusters similarly contains one or more EGMs similar to the EGMs 410 of EGM cluster 414.

In the example embodiment, each EGM 410 participates as a node in a cluster blockchain 412. The cluster blockchain 412 is a blockchain that is restricted to only the EGMs 410 within that cluster 414. Each EGM 410 of the cluster 414 executes a blockchain software service (not separately shown) that allows the EGM 410 to participate in blockchains (e.g., as participating nodes of the cluster blockchain 412 and/or the system blockchain 422). Each of the EGMs 410 within the cluster 414 shares the cluster blockchain 412, may inspect the cluster blockchain 412, may broadcast transactions into the cluster blockchain 412 (e.g., as tickets are generated or redeemed), and may bundle transactions into blocks and add blocks to the cluster blockchain 412, validate blocks of the cluster blockchain 412, or otherwise participate in the cluster blockchain 412. As such, the EGMs 410A-410N are the set of participating nodes in the cluster blockchain 412. In some embodiments, EGMs 410 are configured (e.g., by a technician) with a cluster identifier associated with a particular EGM cluster 414 and each EGM joins the cluster (e.g., during reboot, start-up of blockchain services, or such). A transaction may be added to the cluster blockchain 412 documenting the registration events.

Each EGM cluster 414, in the example embodiment, also designates one of the EGMs 410 as a "leader node" 416 for that EGM cluster 414. In the example shown in FIG. 4, EGM_1 410A is currently designated as the leader node 416 for that cluster 414. Similarly, each of the other clusters also has a leader node 416 designated. The remaining nodes of the cluster 414 are considered subordinate nodes 418. Each leader node 416, in addition to participating in the cluster blockchain 412 for their own cluster 414, additionally participates in the system blockchain 422. The system blockchain 422 is configured to journal tickets, and in some cases cash deposits, across all EGM clusters 414, as well as perhaps other non-clustered EGMs. In some embodiments, the system blockchain 422 may also include remote EGMs 432 (e.g., from stand-alone EGMs or similarly-clustered EGMs) across a wide area network (WAN) 430. The collection of EGMs or other devices (e.g., TITO system server 108) participating in the system blockchain 422 are referred to herein as system nodes 420. As such, leader nodes 416 participate in both their local cluster blockchain 412 and the system blockchain 422. In some embodiments, any EGM 410 of a cluster 414 may be designated as the leader node 416, and the designation of the leader node 416 may be dynamically determined or transferred from one EGM 410 to another EGM 410 within the cluster 414 at any time (e.g., if the current leader node 416 goes offline or is otherwise unable to participate as the leader node 416). In some embodiments, the designation of leader node is provided to an EGM 410 of the cluster 414 that is otherwise idle (e.g., not currently being operated by a player).

During operation, EGMs 410 generate coin-in or ticket-in transactions (e.g., during coin-in or ticket-in events) or ticket-out transactions (e.g., as tickets are printed) that are broadcast to the other EGMs 410 within the cluster 414. One of the EGMs 410 successfully bundles one or more transactions into a new block and adds the new block to the cluster blockchain 412. As such, the transactions are added to the ledger within the cluster blockchain 412, and may also increase or decrease ledger totals for accounts associated with tickets or EGMs. Each of the EGMs 410 in the cluster 414 also receive a copy of the new block, validate the new block, and determine, from the blockchain, what tickets are legitimate and unredeemed.

Additionally, other EGMs are informed of the new transactions generated by EGMs 410 of the EGM cluster 414. More specifically, the leader node 416 of the cluster 414 replicates cluster-level transactions (e.g., transactions made by cluster EGMs 410) out into the system blockchain 422 as "outbound replicated transactions." The leader node 416 is configured to monitor their local cluster blockchain 412 for any new cluster-level transactions. Each newly-detected cluster-level transaction is copied by the leader node 416 and broadcast as a new transaction out into the system blockchain 422 (e.g., to all of the system nodes 420). One of the system nodes 420 bundles those new transactions, perhaps with other transactions 509, and successfully adds a new block to the system blockchain 422, thereby updating the system-level ledger with updated information on tickets.

The leader nodes 416 also replicate new transactions into their EGM cluster 414 as "inbound replicated transactions." The leader node 416 is configured to monitor the system blockchain 422 for any new system-level transactions. Each newly-detected system-level transaction is copied by the leader node 416 and broadcast as a new transaction into the cluster blockchain 412 (e.g., to all of the cluster EGMs 410). One of the cluster EGMs 410 bundles those new transactions, perhaps with other transactions 509, and successfully adds a new block to the cluster blockchain 412, thereby updating the cluster-level ledger with updated deposits from other EGMs outside of the cluster 414. Each cluster EGM 410 may then determine, from the cluster blockchain 412, which tickets are legitimate and unredeemed.

In some embodiments, EGMs 410 or system nodes 420 contend to bundle transactions and add new blocks to the cluster blockchain 412 or the system blockchain 422, respectively, based on techniques known in the art (e.g., by proof of work). In other words, each EGM 410 in the EGM cluster 414 may act as a miner node, and each leader node 416 or other system node 420 in the system blockchain 422 may act as a miner node. In the example embodiment, at the cluster level, one of the EGMs 410 in each EGM cluster 414 is designated the blocking node for the cluster 414, and that one node collects and bundles all cluster-level transactions into the cluster blockchain 412. For example, the admin node 424 may be designated the blocking node for the blockchain 422 (e.g., for nodes 420), the leader nodes 416 may be designated the blocking nodes for their respective clusters 414, or the TITO system server 108 may be designated the blocking node for the blockchain 310. In some embodiments, the EGMs 410 contend to be the blocking node for the cluster 414 (e.g., randomly, by a single proof of work contest, by contending for control of a shared resource (semaphore), or such). In some embodiments, the system-level nodes may similarly designate a system-level blocking node for the system blockchain 422 by any of the above-described methods.

In some embodiments, an admin node 424 participates in the system blockchain 422. The admin node 424 may broadcast transactions into the system blockchain 422, access the blockchain 422, or otherwise participate as a node in the system blockchain 422. In some embodiments, the TITO system server 108 may be the admin node 424. The admin node 424 may perform management operations associated with ticketing operations being provided by the ticketing blockchain system 400. For example, the admin node 424 may generate validation codes (e.g., secret signatures) for tickets generated by the ticketing blockchain system 400, validate tickets, or perform administrative functions.

In the example embodiment, the blockchains 412, 422 are configured to add a new block on a periodic, regular basis. For example, the blockchains 412, 422 may be configured to add a new block to their respective blockchains 412, 422 every 0.1 seconds or every 0.5 seconds (e.g., if there are any new transactions to be added). The blockchains 412, 422 may define or otherwise include a blocking interval setting that may be used by the blocking nodes to determine when and how frequently to bundle transactions and generate a new block. In some embodiments, each of the blocking nodes may share a heartbeat to time when new blocks are added into each cluster blockchain 412 and when new blocks are added into the system blockchain 422. The heartbeat in conjunction with carefully timed blocking between the cluster level and the system level may allow the ticketing blockchain system 400 to minimize latency for propagation of transactions out from the cluster blockchains 412 into the system blockchain 422 and subsequently back down into the other cluster blockchains 412. Shorter blocking intervals generally increase propagation time for transactions through the blockchain 412 but may incur greater resource costs (e.g., more processing time, more total blocks added to the blockchains 412, 422 over time). The frequency interval of the leader nodes 416 may be separately configurable for outbound replication timing going from the cluster blockchain 412 out into the system blockchain 422 or for inbound replication timing going from the system blockchain 422 into the cluster blockchain 412.

In some embodiments, individual (e.g., un-clustered) EGMs may participate in the system blockchain 422. In some embodiments, the blockchains 412, 422 may additionally include data not associated with ticketing. For example, the EGMs may use the blockchains 412, 422 to memorialize audit data, accounting data, player data, game play data, administer progressive jackpots, or other data generated by or otherwise associated with electronic game play at the EGMs. In some embodiments, the ticketing blockchain system 400 may implement components or modules of blockchain technology such as is associated with Hyperledger Fabric technology. In some embodiments, the ticketing blockchain system 400 may include a third tier of sub-clustered EGMs (e.g., with one EGM acting as leader node between, for example, EGM cluster 414 and a sub-cluster of EGMs (not shown)).

Figure 5:
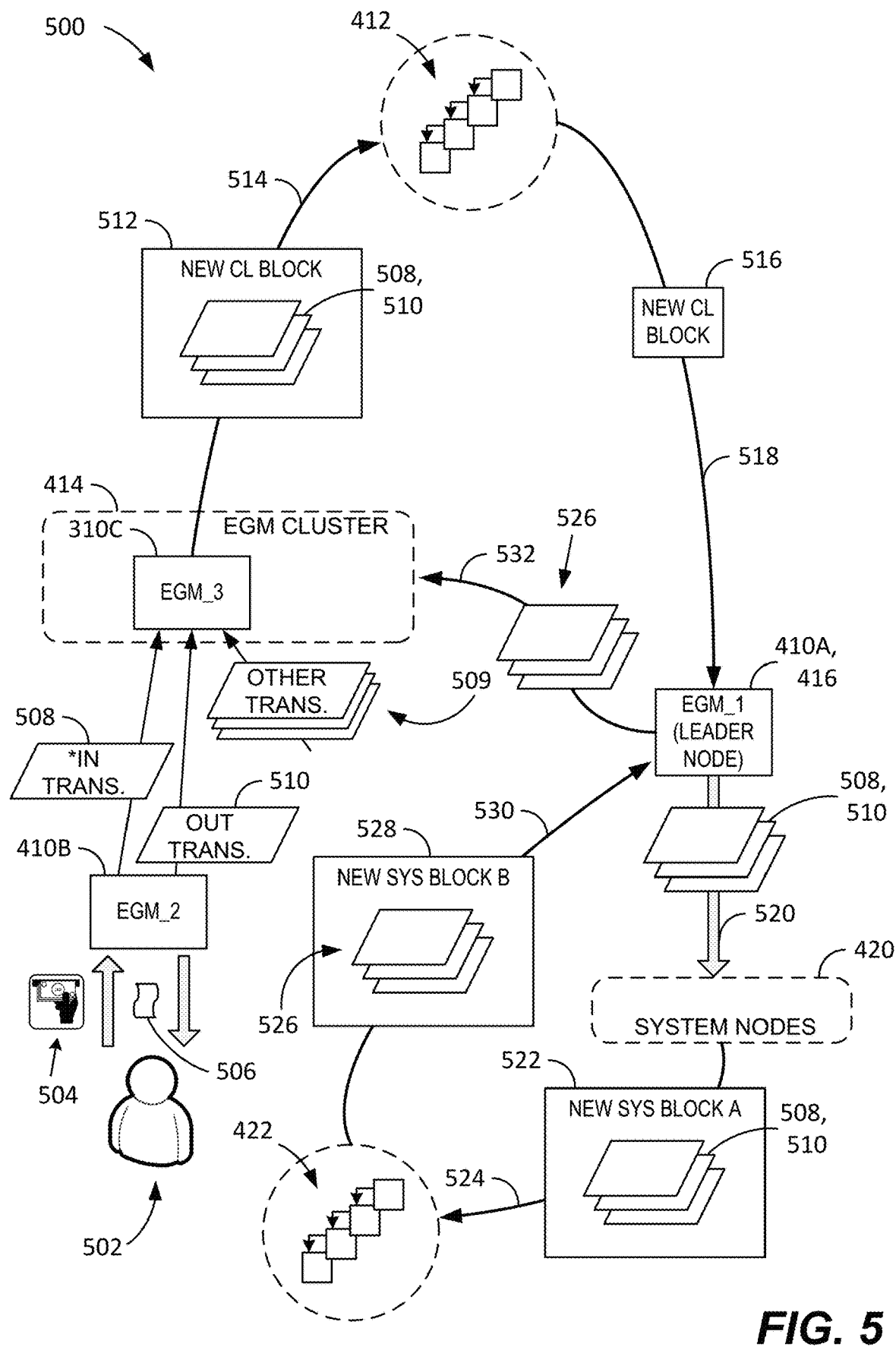
FIG. 5 is a data flow diagram illustrating various blockchain operations performed within the ticketing blockchain system.

FIG. 5 is a data flow diagram 500 illustrating various blockchain operations performed within the ticketing blockchain system 400. In the example embodiment, diagram 500 illustrates an outbound replication process and an inbound replication process for coin-in and TITO transactions. For the outbound replication process, various EGMs 410 within the EGM cluster 414 generate coin-in/ticket-in transactions 508 or ticket-out transactions 510 during game play. For example, during the coin-in/ticket-in transaction 508, a player 502 may insert cash or a ticket 506 into a bill validator 504 at EGM_2 410B. During the ticket-out transaction 510, the EGM 410B may print the ticket 506 from a ticket printer (not separately shown in FIG. 5). Each transaction 508, 510 represents a transaction that is broadcast to the EGM cluster 414 for addition to the cluster blockchain 412. Periodically, the nodes of the cluster 414 (e.g., the blockchain services executing on the EGMs 410) collect multiple transactions from other nodes of the cluster 414, bundle those transactions into a new cluster block 512, and may contend with other nodes of the cluster 414 to add the new cluster block 512 to the cluster blockchain 412. In the example shown here, EGM_2 410B has been tasked to add new cluster block 512 to the cluster blockchain 412 (depicted here as arrow 514).

The leader node 416 of EGM cluster 414, EGM_1 ("leader node") 410A, inspects the cluster blockchain 412 looking for any new transaction added to the blockchain 412. In the example embodiment, the leader node 410A identifies the new cluster block 516 (depicted here as arrow 518) and extracts the new transaction 508, 510 from the block 516. The leader node 410A then broadcasts the transaction 508, 510 out to the system nodes 420 as a new transaction for addition into the system blockchain 422 (depicted here as arrow 520). One of the nodes within the system nodes 420 collects the new transaction 508, 510, and perhaps other transactions 509 broadcast within the system nodes 420, bundles those transactions 508, 510 into a new system block ("new sys block A") 522, and may contend with other nodes of the system nodes 420 to add the new sys block A 522 to the system blockchain 422. In this example, one of the system nodes 420 (not depicted) has been tasked to add the new system block A 522 to the system blockchain 422 (depicted here as arrow 524). As such, new transactions being generated from within the EGM cluster 414 are both memorialized within the cluster blockchain 412, and are also replicated out to the system blockchain 422, thereby completing the outbound replication process.

For the inbound replication process, the leader node 410A of EGM cluster 414 identifies that a new system block ("new sys block B") 528 has been added to the system blockchain 422 (depicted here as arrow 530). The new system block 528 includes new transactions 526 (e.g., one or more transactions not yet processed by the leader node 410A). The leader node 410A extracts the new transactions 526 from the block 528 and broadcasts each of those new transactions 526 into the EGM cluster 414 (e.g., to all of the cluster EGMs 410) (depicted here as arrow 532). While not separately depicted here, these new transactions 526 may subsequently be added to the cluster blockchain 412 similar to how the transactions 508, 510 were added as described above. As such, new transactions being generated from outside the EGM cluster 414 are both memorialized within the system blockchain 422, and is also replicated into the cluster blockchain 412, thereby completing the inbound replication process.

Transactions 508, 510 include various data fields that allow the blockchains 412, 422 to memorialize various information that facilitates both the tracking and redemption of tickets 506 as well as supporting accounting, auditing, and regulatory compliance of the ticketing blockchain system 400. In the example embodiment, ticket-in and ticket-out type transactions include a credit value indicating a redemption value for the ticket. At the time of a ticket-out event, the EGM 410B prints the ticket 506, broadcasts the ticket-out transaction to the EGM cluster 414 (e.g., as described above), and sets the credit value of the ticket to be equal to the current credit total of the player 502 at the EGM. The ticket 506 may have the credit value printed on the ticket 506 during a ticket-out transaction. During a ticket-in transaction, the credit value identified within the blockchain 412, 422 for that ticket is the redemption value used when redeeming that ticket (e.g., credit amount given on another EGM, dollar value given at a cashier's window or redemption kiosk).

Ticket-in and ticket-out type transactions, in the example embodiment, also include a ticket identifier ("ID"). The ticket ID is a unique ID for each ticket generated by the ticketing blockchain system 400. In some embodiments, the EGM 410B generates the unique ticket ID by concatenating a unique machine identifier associated with the EGM 410B together with a unique ticket string locally generated and tracked by the EGM 410B (e.g., a subsequent number in a sequence, a timestamp). In some embodiments, the ticket ID includes a ticket validation code provided and tracked by the TITO system (e.g., the TITO system server 108). The ticket ID is used by the ticketing blockchain system 400, in some cases, as an account number for the ticket within the blockchains 412, 422. When the new ticket 506 is created, the EGM 410B generates the new ticket ID and adds that ticket ID to the ticket-out transaction 510. When the ticket 506 is later redeemed (e.g., at another EGM, kiosk, or cashier's device in the ticketing blockchain system 400), the ticket-out transaction 510 is located within the blockchain 412, 422 by the redeeming device based on the ticket ID provided on the ticket 506. Further, the ticket ID is then added to the ticket-in transaction 508 by the redeeming device. In some embodiments, the blockchains 412, 422 may include one ticket-out transaction with a positive credit to the ticket ID and one ticket-in transaction with a negative credit from the ticket ID.

In some embodiments, transactions 508, 510 may include a source device ID of the EGM creating the ticket 506 (e.g., in a ticket-out transaction 510) or of the redeeming device (e.g., in a ticket-in transaction 508). Transactions 508, 510 may also include a timestamp of the transaction 508, 510. In some embodiments, transactions 508, 510 may include a transaction type ID (e.g., coin-in, ticket-in, ticket-out).

In some embodiments, the ticketing blockchain system 400 may track coin-in events within the blockchain(s) 412, 422. For example, during a coin-in event, the EGM 410B may generate the coin-in transaction 508 to include a dollar value accepted from the bill validator 504, the EGM ID, and a timestamp. In some embodiments, the EGM 410B may also generate a unique coin-in ID for each coin-in event similar to the unique ticket ID. In such embodiments, the coin-in transaction 508 may be treated as a source of value for a later ticket-out transaction at that EGM 410B.

In normal operation, each transaction 508, 510 propagates throughout the blockchains 412, 422 and is thus available to any of the participating devices (e.g., EGMs 410, system nodes 420, admin nodes 424, teller nodes 426, remote EGMs 432, and so forth). However, in some situations, one or more EGMs 410 may become separated, segmented, or otherwise disconnected from some or all of the ticketing blockchain system 400. For example, presume EGM_2 410B becomes isolated from the EGM cluster 414 and the network 402 at a point in time. In such a situation, if EGM_2 generates and prints the new ticket 506 with a value of $50.00, the corresponding broadcast of the ticket-out transaction 510 to the EGM cluster 414 will fail (e.g., not be received by any of the other EGMs 410), and thus will not get promptly added to the blockchains 412, 422. As such, if the player 502 takes the ticket 506 to another EGM or other redemption device, that redemption device will not be able to locate and verify the ticket-out transaction 510 associated with the ticket 506 (referred to herein as an "unidentified ticket" scenario).

In some embodiments, when an unidentified ticket is submitted for redemption to another EGM, that EGM may refuse to honor the ticket 506, may hold or return the ticket 506 to the player 502, or may alert staff to investigate the issue.

In the example embodiment, validation codes are included with each new ticket transaction. Validation codes serve as a secret signature (e.g., generated via RNG) that may be associated with a particular ticket and used for authentication of the ticket. In some embodiments, validation codes may be generated by the TITO ticket server 108. In other embodiments, validation codes may be generated by the EGMs 410. In some embodiments, a pool of pre-generated validation codes for tickets may be created and assigned to the EGM cluster 414 (e.g., administered by the leader node 416) or to individual EGMs 410. The pre-generated validation codes for all nodes in the blockchains 412, 422 are stored in the blockchains 412, 422 and, as such, all nodes have knowledge of all of the pre-generated validation codes. During a segmentation scenario (e.g., if the EGM 410, leader node 416, or EGM cluster 414 is disconnected from the broader system blockchain 422 or TITO ticket server 108), the segmented EGM 410 may utilize one of the pre-generated validation codes during new ticket generation. Because of the segmentation, the locally-generated transaction may not be able to be fully transmitted to the other parts of the blockchain 422. However, since all nodes have knowledge of the pre-generated validation code, the other nodes can still validate at least the authenticity of the code, though not able to verify the credit value printed on the ticket. In some embodiments, the ticketing blockchain system 400 may be configured to redeem such segmented tickets (e.g., tickets not appearing in the current blockchain 412, 422 but having an authentic validation code) if certain segmented ticket validation criteria are met. For example, the operator may be willing to accept risk for tickets under a certain pre-determined threshold (e.g., less than $100 or less than $500), or for a certain period of time (e.g., less than 10 minutes old, less than 30 minutes old).

Figure 6A:
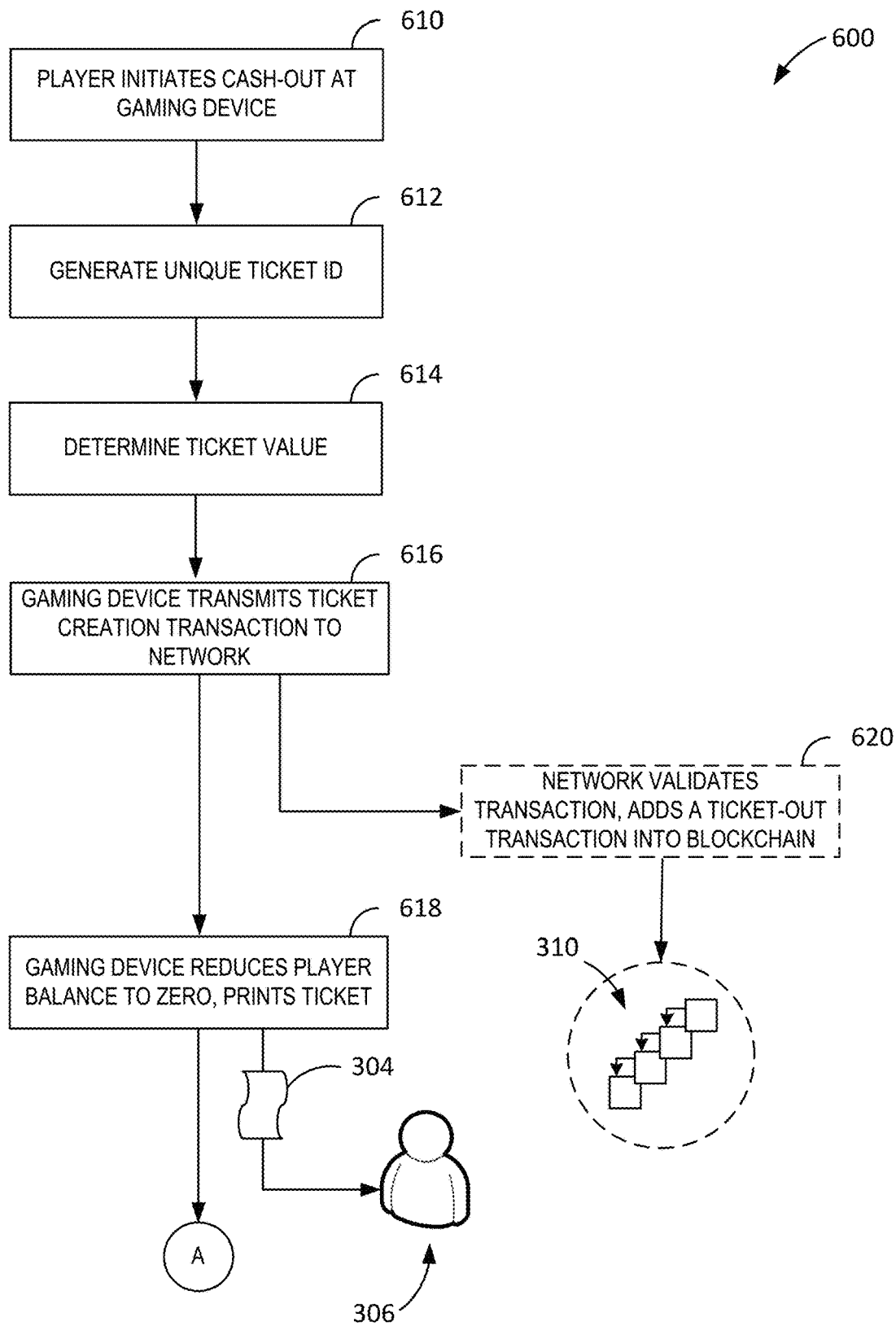
FIG. 6A illustrates an example method for creating a ticket using the ticketing blockchain system and the P2P network shown in FIG. 3.

FIG. 6A illustrates an example method 600 for creating a ticket 304 using the ticketing blockchain system 300 and the network 302 shown in FIG. 3. In the example embodiment, the ticket creation process is described as performed by a gaming device 104, 200 (e.g., as the "issuing device") and in the context of a "cash-out" operation at the gaming device, where the player 306 holds a balance on the device and wishes to transfer that value to a ticket 304. However, it should be understood that this process can be performed by any participating node in the network 302 that can print tickets 304 and participate in the blockchain 310, and that can accept value from the player 306 in response for embodying that value in the ticket 304.

At operation 610, in the example embodiment, the player 306 holds a positive balance at the gaming device 104 and initiates a cash-out operation at the gaming device 104 (e.g., through pressing a mechanical or virtual button on the gaming device 104). Upon detecting the cash-out player input, at operation 612, the gaming device 104 prepares transaction data for a new ticket-out (or "ticket creation") blockchain transaction 318 by generating a unique ticket ID for this ticket 304 at operation 612 (e.g., concatenating a unique device ID with a current timestamp, or the like). The gaming device 104 also determines a ticket value for the ticket at operation 614 (e.g., based on a credit balance on the gaming device 104). The gaming device 104 creates a ticket-out blockchain transaction 318 having the ticket ID and ticket value, and optionally other data fields, and transmits that ticket-out transaction 318 to the network 302 (e.g., broadcasting to neighbor nodes, or the like) at operation 616. The gaming device 104 reduces the credit balance on the gaming device 104 to zero and prints a physical TITO ticket (e.g., the ticket 304) which can be taken by the player 306.

In the example embodiment, the new ticket-out transaction 318 propagates through the nodes of the network 302 and is eventually bundled together with other transactions 318 and memorialized in a new block 312 that is added to the blockchain 310 of all participating nodes at operation 620. It should be understood that the operations shown in broken line in FIGS. 6A and 6B are operations performed by a participating node in the network 302 (e.g., a miner node or node that is otherwise tasked with creating the next block 312 on the blockchain 310), and those operations are not necessarily performed by the issuing or redeeming device.

Figure 6B:
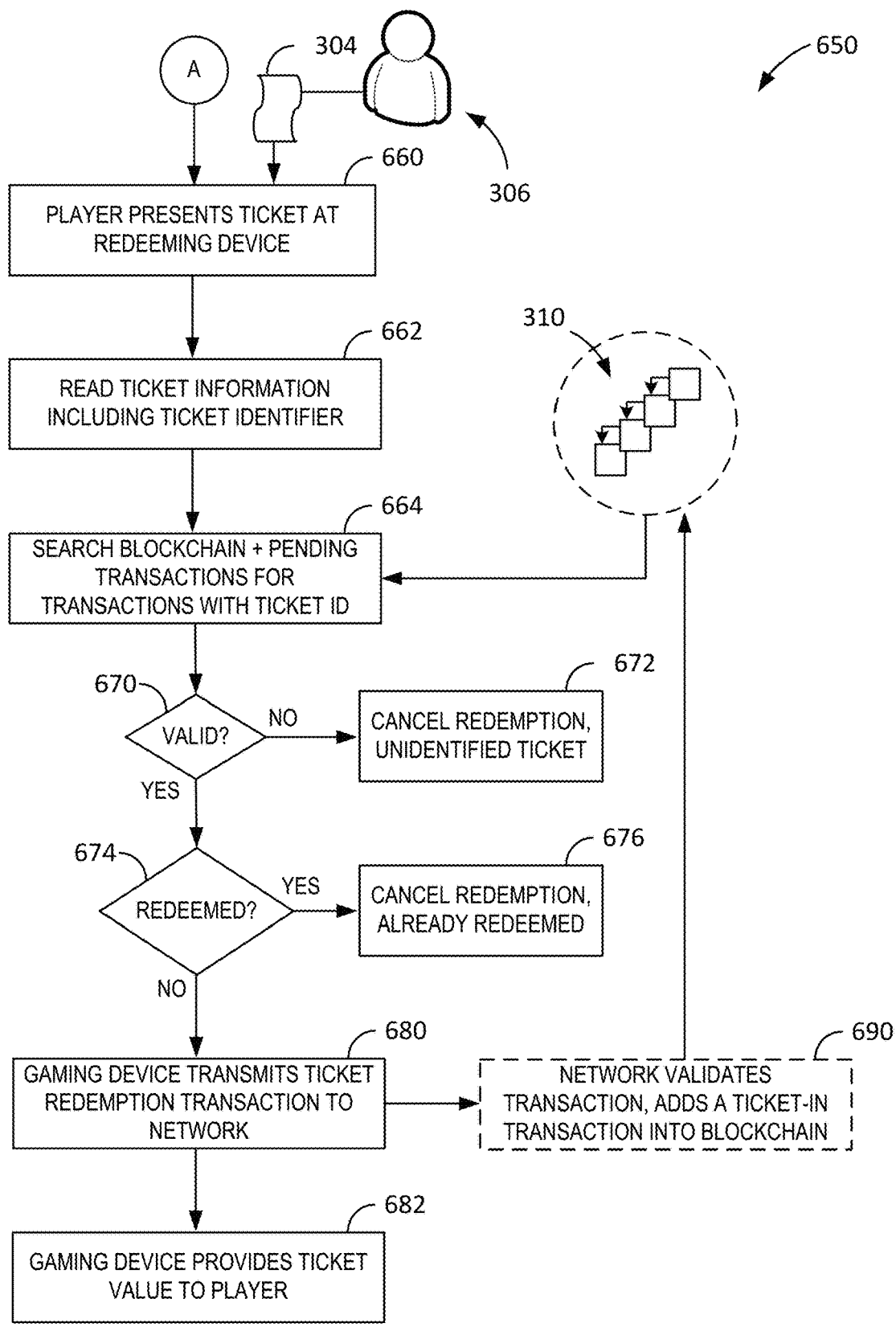
FIG. 6B illustrates an example method for redeeming the ticket created in FIG. 6A using the ticketing blockchain system and the P2P network.

FIG. 6B illustrates an example method 650 for redeeming the ticket 304 created in FIG. 6A using the ticketing blockchain system 300 and the network 302. In the example embodiment, the ticket redemption process is described as performed by another gaming device 104, 200 (e.g., as the "redeeming device") and in the context of a "ticket presentation" operation at the gaming device, where the player 306 inserts the ticket 304 into the redeeming device (e.g., into ticket reader 224) in exchange for a credit balance on the gaming device 104 (e.g., to begin a game play session). However, it should be understood that this process can be performed by any participating node in the network 302 that can redeem tickets 304 and participate in the blockchain 310, and that can transfer value to the player 306 in response to accepting the ticket 304.

At operation 660, in the example embodiment, the player 306 presents the ticket 304 at the redeeming device (e.g., another gaming device 104). At operation 662, the gaming device 104 scans ticket information from the ticket 304 (e.g., via optical scan) and determines the ticket ID for that ticket 304, as well as optionally the ticket value or other data embodied on the ticket. At operation 664, the gaming device 104 searches through the blockchain 310 (e.g., the cluster blockchain 412) and any current pending transactions not yet memorialized in the blockchain 310, using the ticket ID from the ticket 304 to identify any transactions for that ticket ID. The ticket 304 is considered valid if the gaming device 104 finds a ticket-out transaction for that ticket ID. If, at test 670, no ticket-out transaction for that ticket ID is found, then the gaming device 104 cancels redemption of the ticket 304, indicating the ticket as an unidentified and invalid ticket at operation 672. If a ticket-out transaction is identified for the ticket 304, then the gaming device 104 determines whether there is also a ticket-in (or "ticket redemption") transaction for that ticket 304 already added to the blockchain network 302 (e.g., added to the blockchain 310 or pending transaction). The ticket 304 is considered active if there is a ticket-out transaction without a corresponding ticket-in transaction, and inactive (or "redeemed") if there is a ticket-out transaction with a corresponding ticket-in transaction. If, at test 674, the gaming device 104 finds a ticket-in transaction for the ticket 304, then the gaming device 104 cancels redemption of the ticket 304, indicating the ticket as already redeemed at operation 676.

Presuming the ticket 304 is valid and active, the gaming device 104 creates a ticket-in blockchain transaction 318 having the ticket ID, and optionally other data fields, and transmits that ticket-in transaction 318 to the network 302 (e.g., broadcasting to neighbor nodes, or the like) at operation 680. At operation 682, the gaming device 104 increases the credit balance on the gaming device 104 by the ticket value (e.g., as memorialized in the ticket-out blockchain transaction 318 identified by the search) and may retain the physical TITO ticket (e.g., the ticket 304) for later recovery and destruction by device operators. The new ticket-in transaction 318 propagates through the nodes of the network 302 and is eventually bundled together with other transactions 318 and memorialized in a new block 312 that is added to the blockchain 310 of all participating nodes at operation 690. As such, the player 306 receives the ticket value one time, and that ticket is subsequently expired and invalid if a subsequent redemption attempt of the same ticket 304 is attempted.

In some embodiments, a virtual ticket may be issued (e.g., in addition to, or in lieu of, physically printing a ticket). For example, at operation 618, a virtual ticket may be generated and transmitted to a known player (e.g., a member of a loyalty program). The player 306 may receive, view, and use the virtual ticket via the player app installed on their personal mobile device. The gaming device 104 may transmit a virtual ticket to an account of the player 306 (e.g., managed by the casino management system server 114 or the like), and that virtual ticket may include any or all of the associated ticket information. The player app is configured to display the virtual ticket such that the player 306 can present and scan the ticket (e.g., the optical machine-readable label) at an optical scanner of a gaming device 104, kiosk, or the like. In some embodiments, the player app may be configured to allow the player 306 to redeem the virtual ticket at a particular device without scanning an optical code (e.g., after wirelessly establishing a presence at the gaming device 104, gaming table 332, kiosk, or the like). For example, the player app may be configured to wirelessly establish a presence at the particular device (e.g., gaming device 104, gaming table 332, kiosk, or the like), thereby identifying a particular device as the redeeming device. When the player 306 chooses to redeem the virtual ticket, the mobile device wirelessly communicates with the redeeming device or a backend support system (e.g., casino management system server 114, TITO system server 108, or the like), identifying the ticket ID of the ticket to be redeemed and the redeeming device. Upon verification of the ticket (e.g., as shown in FIG. 6B), the redeeming device provides the ticket value to the player 306 (e.g., as credit balance on the gaming device 104) and marks the virtual ticket as redeemed in the blockchain 310.

In some embodiments, the ticketing blockchain system 300 uses smart contracts for redeeming the ticket 304. For example, the ticketing blockchain system 300 or another participating node may upload a ticket redemption smart contract (not separately depicted) into the blockchain 310 that is configured to perform redemption operations. More specifically, a ticket 304 is created in the blockchain 310 (e.g., after a ticket-out blockchain transaction 318 is created and added to the blockchain 310), as shown and described in FIG. 6A. Upon the player presenting the ticket at the redeeming device (e.g., at operation 660, 662), the redeeming device may verify that the ticket 304 is valid and active in the blockchain 310 (e.g., at operations 664-674). At operation 680, the redeeming device transmits a ticket-in transaction to the blockchain 310 (e.g., at operation 680, 690), but the ticket-in transaction is not configured to transfer funds (e.g., does not perform operation 682). Rather, the ticket-in transaction is the recording of an event for receiving the ticket, as well as a triggering condition for the execution of the ticket redemption smart contract.

The ticket redemption smart contract is configured to trigger upon detection of any new ticket-in transactions. When a new ticket-in transaction is posted to the blockchain 310, the ticket redemption smart contract executes. This smart contract reads the ticket ID from the ticket-in transaction and may perform the searching and testing operations (e.g., operations 664-676, but basing activity of the ticket on the lack of existence of a past redemption transaction for that ticket at test 674). Upon verification of a valid and active ticket 304, the smart contract creates and transmits a redemption transaction for the ticket 304 and transmits that transaction into the blockchain network 302 for addition to the blockchain 310. The redemption transaction includes the ticket ID, the ticket value, and the redeeming device ID. In some embodiments, the redemption transaction transfers the ticket value from the ticket account to an account associated with the redeeming device. In some embodiments, the smart contract transmits a network message directly to the redeeming device verifying the validity of the ticket redemption, thus allowing the redeeming device to provide the ticket value to the player (e.g., at operation 682). In some embodiments, the redeeming device inspects blockchain transactions (e.g., in the blockchain 310, or pending transactions) looking for the redemption transaction associated with the ticket 304 before providing the ticket value to the player.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A blockchain system for providing ticketing within a blockchain network of participating electronic devices, the blockchain system comprising an electronic gaming machine configured to participate in the blockchain network, the electronic gaming machine comprising:
a memory storing a local blockchain and a system blockchain, the local blockchain supporting a first plurality of electronic gaming devices of the blockchain network, the system blockchain supporting a second plurality of electronic gaming devices of the blockchain network; and
at least one processor configured to execute instructions which, when executed, cause the at least one processor to:
identify a first ticket creation blockchain transaction generated in the local blockchain from a ticket creation device of the first plurality of electronic gaming devices, the first ticket creation blockchain transaction including at least a ticket value and a ticket identifier (ID);
create a system ticket creation blockchain transaction including at least the ticket value and the ticket ID; and
broadcast the system ticket creation blockchain transaction to the system blockchain.

2. The blockchain system of claim 1, wherein the first ticket creation blockchain transaction further includes a transaction type identifying the first ticket creation blockchain transaction as a ticket creation transaction.

3. The blockchain system of claim 1, wherein the ticket ID identifies a blockchain account uniquely associated with the ticket ID, wherein the first ticket creation blockchain transaction is a blockchain transaction adding the ticket value to the blockchain account within the local blockchain, wherein broadcasting the system ticket creation blockchain transaction to the system blockchain adds the ticket value to the blockchain account within the system blockchain.

4. The blockchain system of claim 1, wherein identifying a first ticket creation blockchain transaction from a ticket creation device of the first plurality of electronic gaming devices includes searching the local blockchain for ticket creation blockchain transactions not yet replicated by the electronic gaming machine to the system blockchain.

5. The blockchain system of claim 1, wherein the electronic gaming machine creates a new block including the first ticket creation blockchain transaction that is accepted by the blockchain network for addition to the local blockchain under a consensus protocol.

6. The blockchain system of claim 5, wherein creating a new block includes:
identifying a plurality of pending blockchain transactions for the local blockchain including the first ticket creation blockchain transaction;
creating the new block with the plurality of pending blockchain transactions; and
broadcasting the new block to the local blockchain for addition to the local blockchain.

7. The blockchain system of claim 1, wherein the electronic gaming machine is designated as a blocking node for the local blockchain.

8. The blockchain system of claim 1, wherein the instructions further cause the electronic gaming machine to:
identify a system ticket creation blockchain transaction from the system blockchain, the system ticket creation blockchain transaction including at least a second ticket value and a second ticket identifier (ID);
create a local ticket creation blockchain transaction including at least the second ticket value and the second ticket ID; and
add the local ticket creation blockchain transaction to the local blockchain.

9. The blockchain system of claim 1, wherein the instructions further cause the electronic gaming machine to:
identify a ticket redemption blockchain transaction that has not yet been replicated from one of the local blockchain and the system blockchain, the ticket redemption blockchain transaction including at least a second ticket identifier (ID);
create a ticket redemption blockchain transaction, the ticket redemption blockchain transaction including at least the ticket ID; and
broadcast the ticket redemption blockchain transaction to the other of the local blockchain and the system blockchain.

10. The blockchain system of claim 1, wherein the instructions further cause the electronic gaming machine to:
receive an initiation of a cash-out event by a player of the electronic gaming machine;
identify a credit balance at the electronic gaming machine; and
generate the ticket identifier for a redeemable ticket,
wherein identifying the first ticket creation blockchain transaction from a ticket creation device of the first plurality of electronic gaming devices includes creating the first ticket creation blockchain transaction at the electronic gaming machine.

11. The blockchain system of claim 10 further comprising a ticket printer, wherein the instructions further cause the electronic gaming machine to:

print the redeemable ticket at the ticket printer, the redeemable ticket including the ticket identifier; and
reduce the credit balance at the electronic gaming machine to zero after transmitting the first blockchain transaction.

12. The blockchain system of claim 11, wherein the redeemable ticket further includes a validation code and a device identifier of an issuing device, wherein the instructions further cause the at least one processor to:
determine that the issuing device is segmented from the blockchain network;
determine that the validation code is a valid code assigned to the issuing device; and
redeem the redeemable ticket for a ticket value printed on the redeemable ticket based on validity of the validation code.

13. The blockchain system of claim 10, wherein the instructions further cause the electronic gaming machine to create a virtual redeemable ticket, the virtual redeemable ticket including the ticket identifier, the virtual redeemable ticket being assigned to a player account of the player.

14. The blockchain system of claim 1, wherein the instructions further cause the electronic gaming machine to:
receive, at a ticket reader of the electronic gaming machine, a physical ticket for redemption, the physical ticket including a second ticket identifier;
identify the second ticket identifier from the physical ticket;
search one or more of the local blockchain and the system blockchain for (1) an existing ticket creation transaction associated with the second ticket identifier within one or more of the system blockchain and the local blockchain and for (2) an existing ticket redemption transaction associated with the second ticket identifier in one or more of the system blockchain and the local blockchain, the existing ticket creation transaction including a ticket value;
when the existing ticket creation transaction is located by the searching and when the existing ticket redemption transaction is not located by the searching:
establishing a credit at the electronic gaming machine for an amount equal to the ticket value identified in the existing ticket creation transaction;
creating a ticket redemption transaction including the second ticket identifier; and
transmitting the ticket redemption transaction to one or more of the system blockchain and the local blockchain.

15. The blockchain system of claim 14, wherein when either the existing ticket creation transaction associated with the second ticket identifier is not located by the searching or when the existing ticket redemption transaction is located by the searching, the instructions further cause the processor to reject ticket redemption.

16. The blockchain system of claim 14, wherein the searching further includes searching transactions within all accepted blocks within a local copy of the one or more of the local blockchain and the system blockchain and searching one or more pending transactions not yet memorialized in an accepted block in the one or more of the local blockchain and the system blockchain.

17. The blockchain system of claim 1, wherein one or more of the local blockchain and the system blockchain further includes a smart contract configured to execute upon detection of a new ticket redemption blockchain transaction, wherein execution of the smart contract includes:

extracting a redemption ticket ID and a redemption ticket value from the new ticket redemption blockchain transaction;

validating that the redemption ticket ID is valid and active within one or more of the local blockchain and the system blockchain; and transmitting a message to a redeeming device identified within the new ticket redemption blockchain transaction authorizing payment of the redemption ticket value.

18. The blockchain system of claim 1, wherein the blockchain network is a peer-to-peer, permissioned blockchain of private nodes participating in one or more of the local blockchain and the system blockchain.

19. The blockchain system of claim 18, wherein the permissioned blockchain executes a consensus protocol not including a proof of work protocol.

20. The blockchain system of claim 1, wherein the first ticket creation blockchain transaction is created to further include one or more of a unique device identifier of the electronic gaming machine, a timestamp, and a player identifier associated with the player.

\* \* \* \* \*